United States Patent [19]

Pippert

[11] 4,456,448
[45] Jun. 26, 1984

[54] MOLDING APPARATUS

[75] Inventor: Aaron J. Pippert, Houston, Tex.

[73] Assignee: Utex Industries, Inc., Houston, Tex.

[21] Appl. No.: 221,620

[22] Filed: Jun. 4, 1982

[51] Int. Cl.³ .......................... B29C 1/16; B29C 3/02
[52] U.S. Cl. ...................................... 425/234; 34/145;
34/146; 34/232; 34/233; 249/81; 249/120;
249/126; 249/163; 425/256; 425/261
[58] Field of Search .................... 425/234, 261, 256;
249/81, 120, 126, 161, 163; 34/145, 146, 232, 233

[56] References Cited

U.S. PATENT DOCUMENTS

| | | | |
|---|---|---|---|
| 1,211,325 | 1/1917 | Lilly | 34/233 X |
| 1,273,598 | 7/1918 | Flanagan | 34/233 X |
| 1,667,200 | 7/1928 | Oakley | 425/234 X |
| 1,677,201 | 7/1928 | Oakley | 425/234 X |
| 2,206,276 | 7/1940 | Chaplin | 249/79 X |
| 2,290,917 | 7/1942 | Smith | 249/79 X |
| 2,347,600 | 4/1944 | Goode | 425/234 |
| 3,064,363 | 11/1962 | Ikeuchi | 34/145 |
| 3,226,770 | 1/1966 | Senfleben | 249/163 X |
| 3,454,988 | 7/1969 | Cremer | 249/79 X |
| 3,497,173 | 2/1970 | Valyi | 249/79 |
| 3,557,414 | 1/1971 | Alliegro | 425/89 |
| 3,905,735 | 9/1975 | Thomas et al. | 425/256 |
| 4,017,980 | 4/1977 | Kleinguenther | 34/145 X |
| 4,064,639 | 12/1977 | Pels-Leusden et al. | 34/233 X |
| 4,265,850 | 5/1981 | Coulon et al. | 249/126 X |

Primary Examiner—Philip E. Anderson
Attorney, Agent, or Firm—Browning, Bushman, Zamecki & Anderson

[57] ABSTRACT

An apparatus for the molding of seals, packings and the like comprising a curing chamber, the curing chamber being heated by a gaseous medium circulated within, and being selectively, substantially closed to ambient temperatures during the curing process. Provision is made to dispose at least one mold in the curing chamber through a lateral opening and to place the mold under compression during the curing process.

17 Claims, 12 Drawing Figures

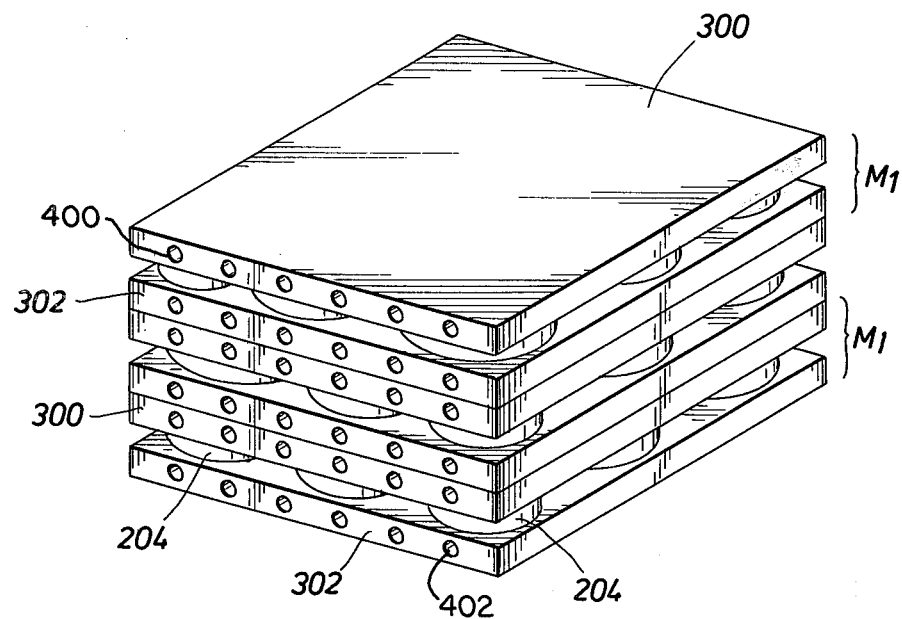
FIG.11
FIG.12
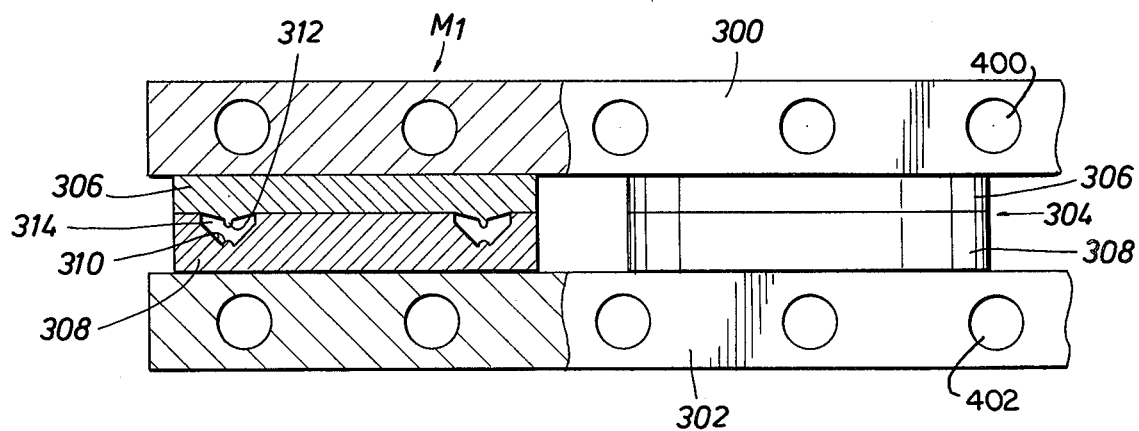

MOLDING APPARATUS

BACKGROUND OF THE INVENTION

The present invention relates to an apparatus for producing molded articles such as seals, packings and the like.

There are numerous types of compression molding presses which utilize hydraulic rams to apply pressure to heated platens between which the molds are disposed. In a typical compression molding press, there are a plurality of spaced platens. The molds are disposed between the platens which in turn are heated either electrically or, more commonly, by means of steam or a liquid medium such as oil which is circulated through channels within the platens. Accordingly, the molding press utilizes the transfer of heat from the individually heated platens to the mold to effect curing of the article in the mold. Generally, such compression molding presses, such as for example the molding apparatus shown in U.S. Pat. No. 3,905,735, are open, or have the heat transfer bodies, e.g. the molds, open to the ambient resulting in significant losses of heat. Additionally, the heat being radiated from the presses necessitates the use of extensive cooling facilities in the area adjacent the presses to provide a suitable working environment for the operator of the press. Further, due to the fact that in many molding operations gases and vapors are given off from the material being molded during the curing, it is necessary to have hoods or other ventilation equipment disposed above the presses so that the operator is not exposed to the escaping gases and vapors.

Another problem associated with most prior art compression molding presses is that the space between the platens is fixed which necessitates that all molds placed between the platens be of the same height to avoid damage to the molds and/or the platens during the molding operation.

SUMMARY OF THE INVENTION

It is therefore an object of the present invention to provide an improved molding apparatus.

Another object of the present invention is to provide a molding apparatus which minimizes heat losses during the molding process resulting in substantial energy savings.

Still a further object of the present invention is to provide a molding apparatus which does not require the use of a liquid as heating medium and therefore eliminate the need for liquid feed lines, hose constructions, valves, etc.

Another object of the present invention is to provide a molding apparatus which does not need to utilize conventional platens and in which molds of varying heights can be accommodated.

Yet a further object of the present invention is to provide a molding apparatus in which the molds may be introduced and removed by means of conveying equipment and without the necessity for lift tables, hoists, etc.

The above and other objects of the present invention will become apparent from the drawings, the description given herein and the appended claims.

The molding apparatus of the present invention utilizes a curing chamber, in which can be disposed one or more molds and which can be selectively, substantially closed to ambient temperature during the molding process. The curing chamber is at least partially defined by end walls, one of which is movable toward and away from the other end wall. There is a lateral opening into the chamber between the end walls for permitting molds to be placed in or removed from the curing chamber.

BRIEF DESCRIPTION OF THE DRAWINGS

FIG. 11 is an isometric view of another mold useful in the molding apparatus of the present invention.

FIG. 12 is an enlarged view, partially in section, showing a portion of the mold of FIG. 11.

DESCRIPTION OF THE PREFERRED EMBODIMENTS

Figure 1:
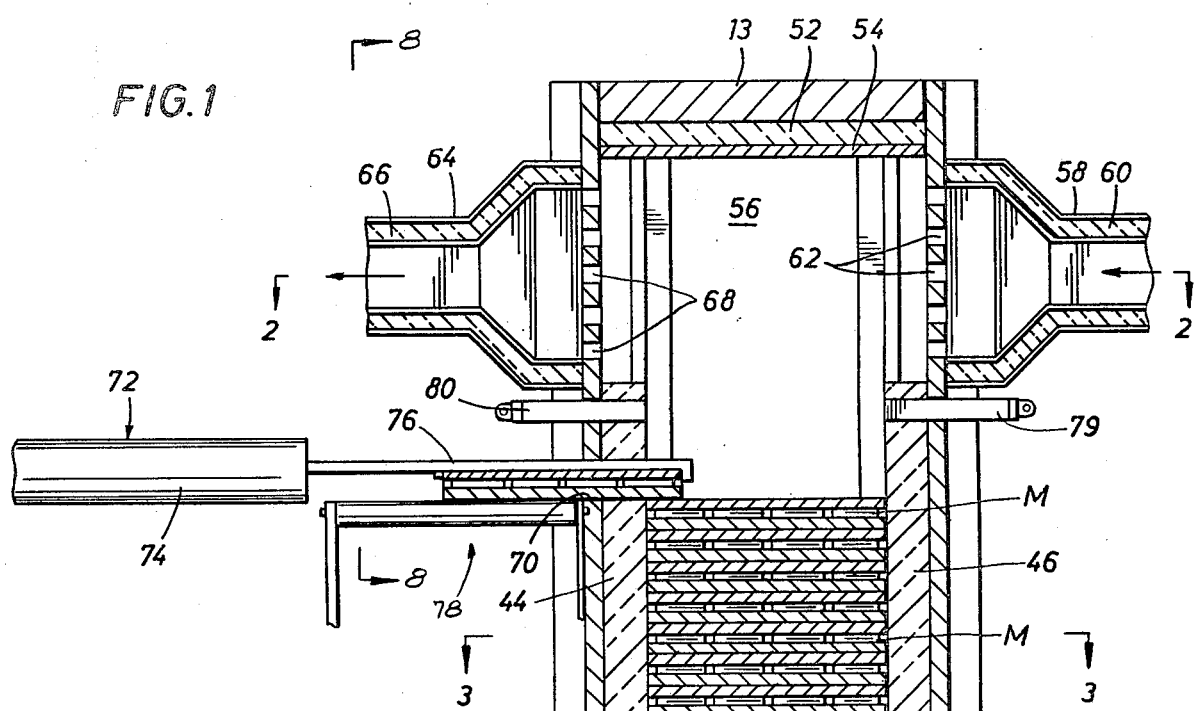
FIG. 1 is an elevational view, partly in section, showing one embodiment of the molding apparatus of the present invention.

Referring first to FIG. 1, the molding apparatus comprises a housing shown generally as 10, having vertical side walls 10a, 10b, 10c and 10d. Housing 10 is held in a frame comprised of four vertically disposed, right angled beams 11a, 11b, 11c and 11d located at the corners of housing 10. Housing 10 also includes a base 12 on which is mounted a hydraulic ram system shown generally as 14. Ram system 14 comprises a hydraulic cylinder 16 in which is received ram or piston 18. As is conventional, hydraulic ram system 14 is provided with stuffing box 20 having a seal 22 for sealingly engaging piston 18 and packing gland 24 secured to stuffing box 20. Cylinder 16 is secured to stuffing box 20 by means of flange 26 and securing bolts 26a. It will be understood that by the proper application or withdrawal of hydraulic fluid to or from cylinder 16, respectively, piston 18 will be caused to move toward and away from base 13, respectively. Piston 18 is provided at its upper end with a support plate 38 upon which is disposed insulation section 40. A header 42 is carried on insulation 40. A series of molds M is disposed on header 42.

Four vertically disposed, right-angled beams 28, 30, 32 and 34, form guiderails for a purpose to be discussed hereafter. Beams 28–34 extend from base 12 up to top section 13 of housing 10 of the molding apparatus. A plate 36 being generally rectangular and having a central, circular aperture 38 for passage of piston 18 is secured at each of its four corners, to beams 28–34.

Disposed internally of housing 10 are insulating side wall sections 44, 46, 48 and 50 which are contiguous side walls 10d, 10b, 10a and 10c, respectively. Insulating wall sections 44–48 extend from plate 30 upwardly to near top section 13. As best seen with reference to FIG. 3, guiderails 28–34 are inset at the corners joined by the intersections of the insulating wall sections 44–50.

Referring now to the upper portion of FIG. 1, an insulating section 52 is disposed contiguous, top section 13 of housing 10. A liner or end wall 54, separated from top section 13 by insulation 52 is secured to the upper portions of guiderails 28-34. It will thus be seen that a chamber 56 is formed by fixed end wall 54, insulating wall sections 44-50 and plate 36. A duct 58 is secured to housing wall 10b and is insulated as at 60. Wall 10b has a series of perforations or bores 62 thereby forming a gas diffuser. A source of heated gaeous medium such as dry or saturated air or the like (not shown) is used to force air through a first, entrance duct 58 and into the upper portion of chamber 56 through the diffuser formed by bores 62. A second, exit duct 64, insulated as at 66, is secured to wall 10d which, like wall 10b, is provided with bores or perforations 68 through which air or other heated gaseous medium leaving chamber 56 passes. It will be appreciated that the heated gaseous medium vented from chamber 56 through duct 64 is preferably recycled back through entrance duct 52 into chamber 56. It will also be appreciated that the gaseous medium, before being recycled, can be treated to remove any noxious gases or vapors removed from chamber 56.

In operation, when piston 18 is caused to move upwardly toward end wall 54, mold M will be moved into the upper portion of chamber 56 through which the heated gaseous medium is flowing. Molds M will then be compressed between upper end wall 54 and header 42 during the curing cycle. It will thus be seen that a heated, curing chamber will be formed, the chamber being defined, at least partially, by header 42 which can be considered a movable end wall and fixed, upper end wall 54.

Figure 9:
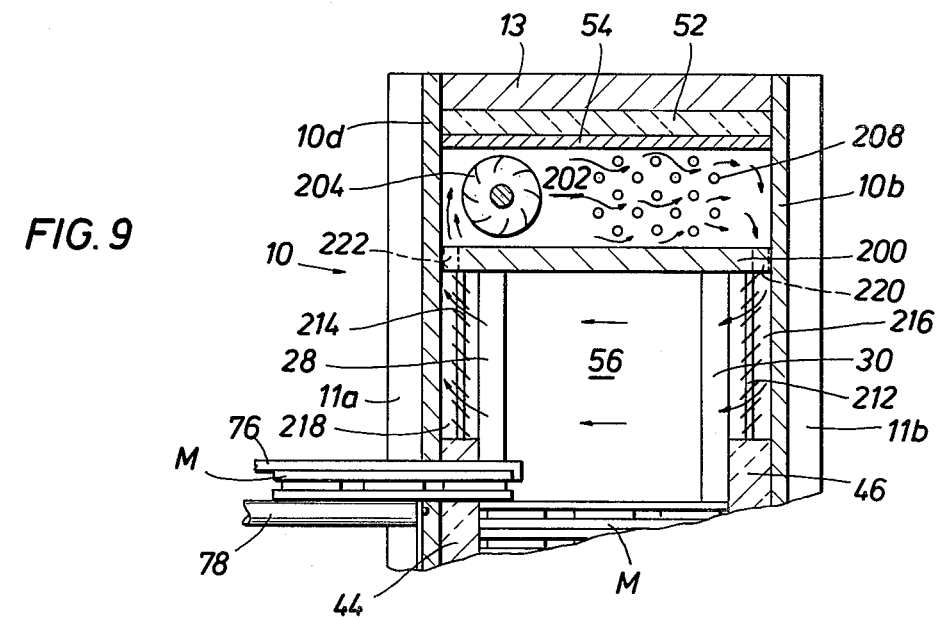
FIG. 9 is a partial elevational view, partially in section, showing another embodiment of the molding apparatus of the present invention.
Figure 10:
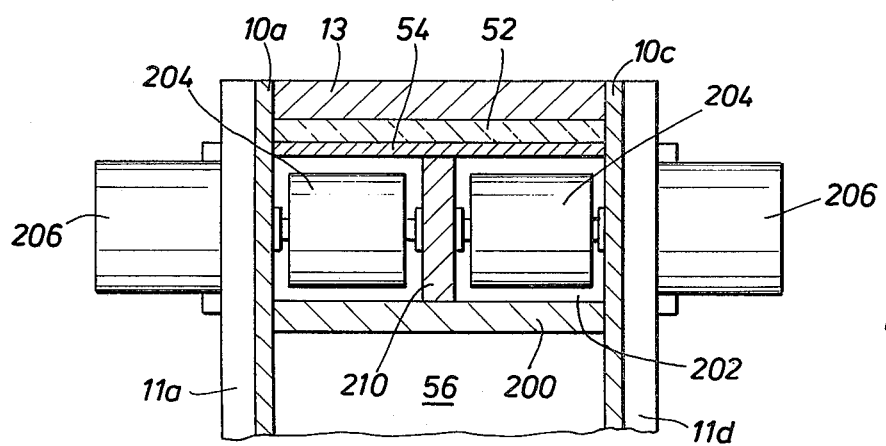
FIG. 10 is a view taken along the lines 10—10 of FIG. 9.

While the molding apparatus has been described with respect to the use of a heated gaseous medium being circulated through the curing chamber 56 by means of an externally mounted circulation system, it will be appreciated that such is not necessary. Referring now to FIGS. 9 and 10, there is shown a slightly modified version of the molding apparatus wherein the heated gaseous medium is circulated within chamber 56 by means of an internally mounted circulation system. A partition 200 secured to beams 28-34 and brace 210 forms the upper end wall of chamber 56. There is thus defined a plenum 202 between partition 200 and upper end wall 54. Mounted in chamber 202 are blowers 204 driven by motors 206 mounted externally of chamber 202. Also disposed within plenum 200 are a series of heating elements 208 which can take the form of electric heating elements or could alternatively be a heat exchanger tube bundle through which a heated liquid would flow.

Vertically disposed within chamber 56 are diffusers 212 and 214, respectively, diffusers 212 and 214 being on opposite sides of chamber 56. The diffusers 212 and 214 can take the form of vertical plates which have adjustable louvers so as to allow the passage of heated gaseous medium therethrough. The diffusers 212 and 214 are vertically mounted between upper end wall 200 and the upper end of insulating wall sections 46 and 44, respectively. With particular reference to FIG. 9, it can be seen that there is a space 216 formed between the diffuser 212 and side wall 10b and a similar space 218 formed between the diffuser 214 and side wall 10d. Space 216 communicates with plenum 202 by virtue of a series of ports 220 (shown in phantom) extending through upper end wall 200. Space 218 communicates with plenum 202 by virtue of a series of similar ports 222 (also shown in phantom) extending through upper end wall 200. It can thus be seen that when blowers 204 are in operation, heated gaseous medium will be forced over heating elements 208, through ports 220 into space 216 and then through the diffuser 212 into chamber 56. The heated gaseous medium will flow across chamber 56 and exit through diffuser 214 into space 218 and return to plenum 202 via ports 222. As in the case of the embodiment shown in FIG. 1, the structure shown in FIGS. 9 and 10 allows the heated gaseous medium to be forced from one side of chamber 56 to the opposing side such that molds disposed therein are exposed to a heated gaseous medium which is not quiescent within chamber 56 but which is moving across chamber 56 and hence across the molds.

Figure 8:
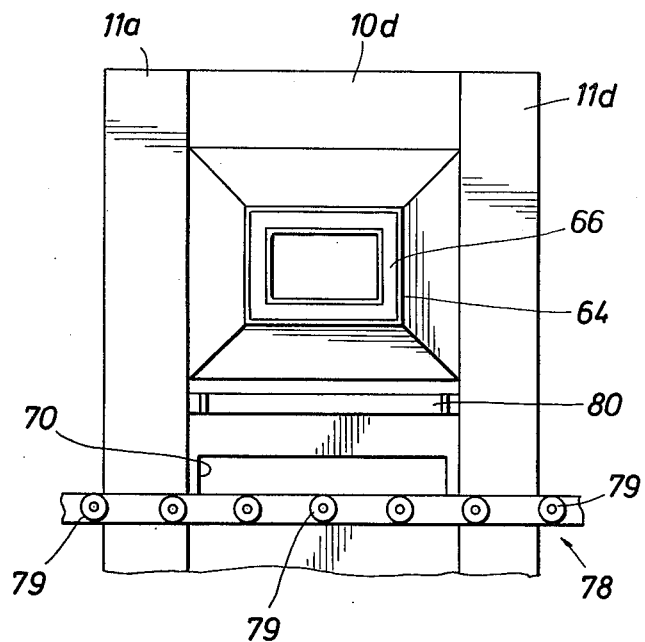
FIG. 8 is a view taken along the lines 8—8 of FIG. 1.

As best seen with reference to FIGS. 1 and 8, wall 10b and insulating wall section 44 are provided with a lateral opening 70 through which molds can be introduced into and removed from the curing chamber 56 as hereafter described. It will be apparent with reference to FIG. 1 that lateral opening 70 is located such that it lies between end walls 54 and 42 when end wall 42 is at its lowermost position i.e. when it is furthest from end wall 54. The unique method of loading and unloading chamber 56 via lateral opening 70 ensures a minimum amount of heat loss from the curing chamber 56 during the loading and unloading processes. Disposed adjacent opening 70 is mold loader and unloader 72 comprising hydraulic piston-cylinder arrangement 74 attached to load-unload arm 76. Piston cylinder system 74 is arranged such that arm 76 can be reciprocated through opening 70 into and out of chamber 36 whereby molds may either be placed into chamber 56 or removed from chamber 56. Also disposed adjacent opening 70 is a conveyour assembly having rollers 79 from which molds with uncured preforms can be removed and loaded into chamber 56, or onto which molds of cured articles can be placed when removed from chamber 56 for further processing.

Figure 3:
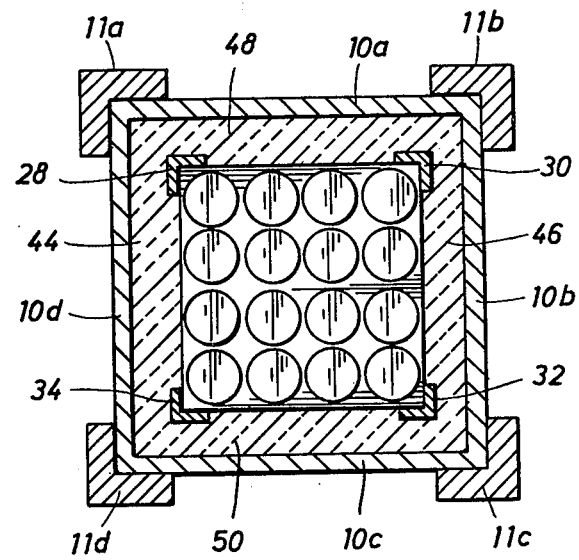
FIG. 3 is a view taken along the lines 3—3 of FIG. 1.

As shown in FIGS. 1 and 3, a plurality of molds M (hereinafter described) is disposed on top of header 42 and in the lower part of chamber 56. It will be appreciated that with arm 76 retracted out of opening 70, piston 18 can be moved upwardly until molds M will be in the upper part of chamber 56, the top most mold abutting liner 54. Pressure can then be continuously applied by ram system 14 so that the vertically stacked molds M are compressed between header 42 and liner 54. Heated gaseous medium being circulated through the upper part of chamber 56 via ducts 58 and 64 provides the necessary curing temperatures to complete the molding process. When the curing process is complete, piston 18 can be retracted downwardly into cylinder 16 to the point where arm 76 can be moved in through opening 70 to engage one or more of the molds M from the top of the stack for removal. As each mold M is removed, piston 18 can be raised slightly so as to enable arm 76 to engage the next mold M until all the molds are removed.

Molds M containing new uncured preforms may then be introduced through opening 70 and placed on top of header 42, piston 18 being lowered into the lower portion of chamber 56 until a complete stack of molds M is on header 42. The stack of molds M can then be elevated into the upper portion of chamber 56 for curing and compression by ram system 14.

In certain circumstances, it may be desirable to cycle the molds M within the molding apparatus rather than having all molds removed from chamber 56 once the curing process is complete. To this end, there are provided latches 79 and 80 which can be used to hold one or more molds M in the upper portion of the curing chamber 56 while piston 18 is lowered into the lower portion of curing chamber 56. Latches 79 and 80, which may take many different forms, are extendable and retractable into and out of chamber 56, and are engageable with molds M to prevent the molds from dropping from the upper part of chamber 56. In cycling the molds in the curing chamber 56, latches 79 and 80 would engage the mold stack and the piston 18 would be retracted into the lower portion of the chamber 56. Molds containing uncured preforms would then be introduced through opening 70 and positioned on top of header 42. Piston 18 is then elevated and the molds at the bottom of the stack containing the uncured preform are accordingly elevated into the upper portion of chamber 56 at the bottom of the stack for curing under pressure. Following curing, piston 18 can be lowered with the mold stack M and one or more molds M removed from the top of the stack. Piston 18 can then again be elevated into the upper portion of chamber 56 where pressure can be applied on the remaining molds in the stack. When additional molds are to be removed, piston 18 is lowered into the lower portion of chamber 56 and the desired number of molds removed from the top of the stack. Thus, molds are continuously removed from the top of the stack while molds containing uncured preforms are continuously introduced at the bottom of the stack.

In the molding apparatus described above, the ram system employs a single acting piston in which the piston is elevated by means of hydraulic pressure and lowered by force of gravity. It will be understood however that a double acting system can be employed in which the piston is moved upwardly and downwardly by the application of fluid pressure. It will also be apparent that multiple ram systems may be employed to position the molds, to apply pressure, etc.

An important feature of the present invention is the fact that curing chamber 56 can be kept substantially closed to ambient temperature thereby minimizing loss of heat from the curing chamber and virtually eliminating the possibility that noxious gas or vapors will escape from the curing chamber to endanger the safety of the workers around the molding apparatus. It will be seen that when the molds are in the upper part of chamber 56, little if any of the heated gaseous medium can escape between the sides of header 42 and the inside surfaces of the insulating wall sections 44-50 and leave the molding apparatus via opening 70. By providing a movable flap over opening 70, virtually no heat is lost to the ambient outside of the chamber 56.

Figure 4:
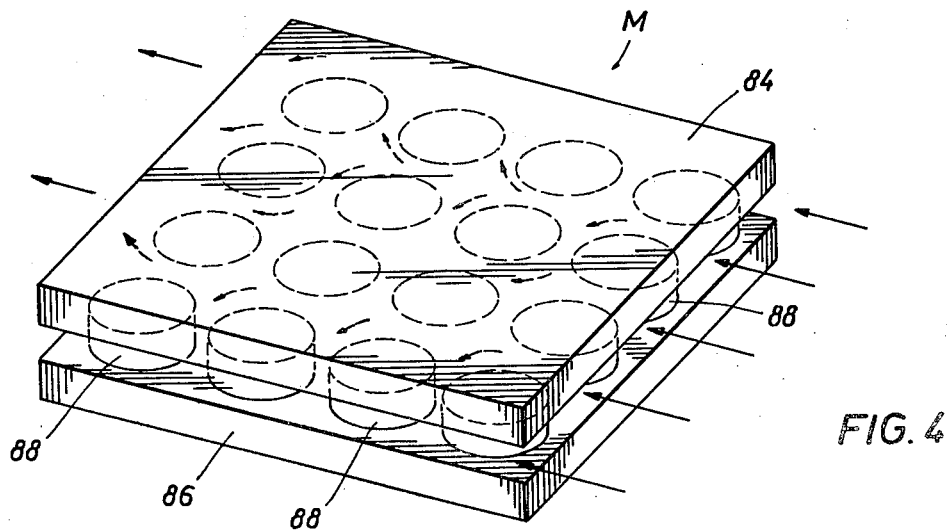

Referring to FIG. 4, there is shown a mold useful in the molding apparatus of the present invention. The mold M comprises a first mold frame 84 and a second mold frame 86. The mold frames 84 and 86 are provided with mold cavity defining inserts 88 which, as seen more clearly hereafter with reference to FIG. 7, form male and female portions which are projecting as to one and receiving as to the other to provide the desired shape of the article to be molded. As can be seen with reference to FIG. 4, mold M permits easy circulation of the heated gaseous medium between the mold frames 84 and 86 and around the mold cavity defining inserts 88 thus ensuring uniform and rapid heat transfer between the heated gaseous medium and the preforms inside mold cavity defining inserts 88.

Figure 5:
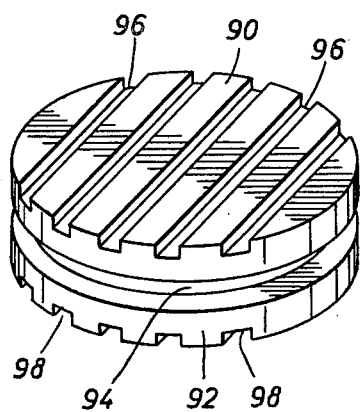
FIGS. 4–6 are isometric views of molds useful in the molding apparatus of the present invention.
Figure 2:
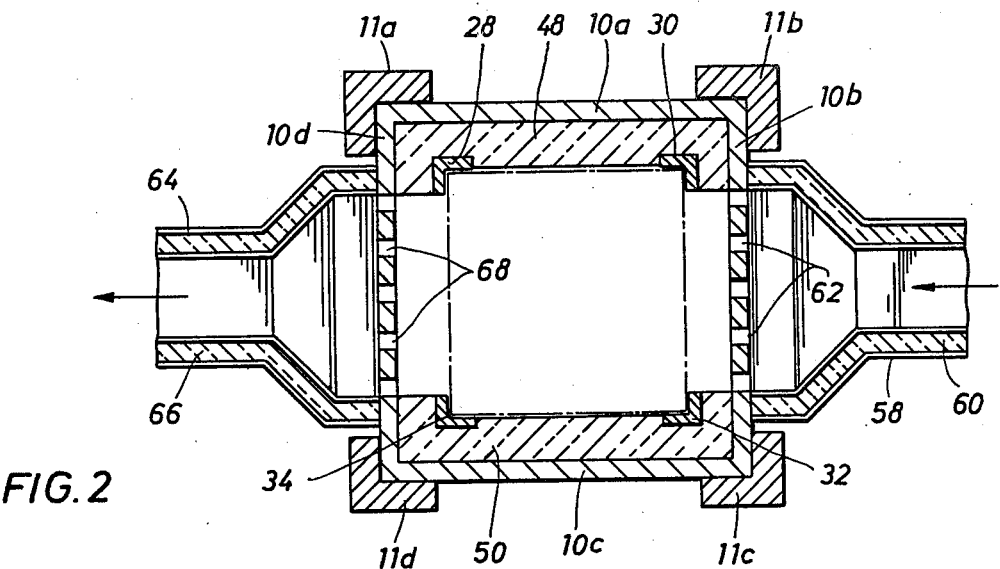
FIG. 2 is a view taken along the lines 2—2 of FIG. 1.

FIG. 5 shows a mold which is generally circular in configuration and has a first mold frame 90 a second mold frame 92 and a mold cavity defining insert 94 disposed therebetween. Mold frames 90 and 92 are provided with channels 96 and 98, respectively, channels 96 and 98 providing enlarged heat transfer surfaces whereby heat from the heated gaseous medium is rapidly and uniformly transferred to the mold cavity defining insert 94.

Figure 6:
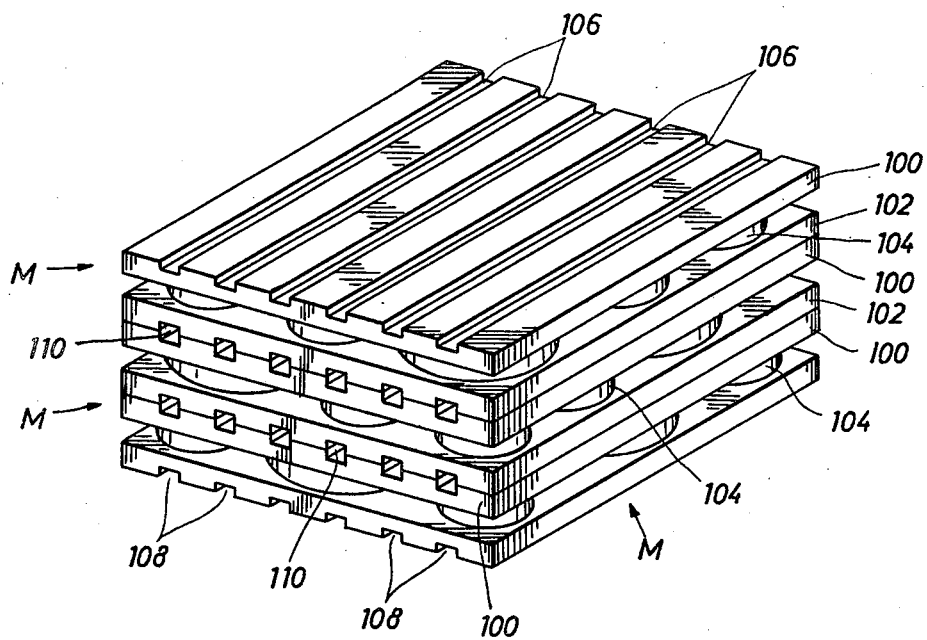

FIG. 6 shows a series of stacked molds M each having a first mold cavity defining frame 100, a second mold frame 102 with mold inserts 104 disposed therebetween. Mold frame 100 is provided with channels 106 while mold frame 102 is provided with channels 108. It can be seen that when the molds are stacked, channels 106 and 108 are in register thereby providing tunnels 110 through which the heated gaseous medium can flow ensuring rapid and uniform heat transfer to the mold cavity defining inserts 104 containing the uncured articles, e.g. packings or the like.

Figure 7:
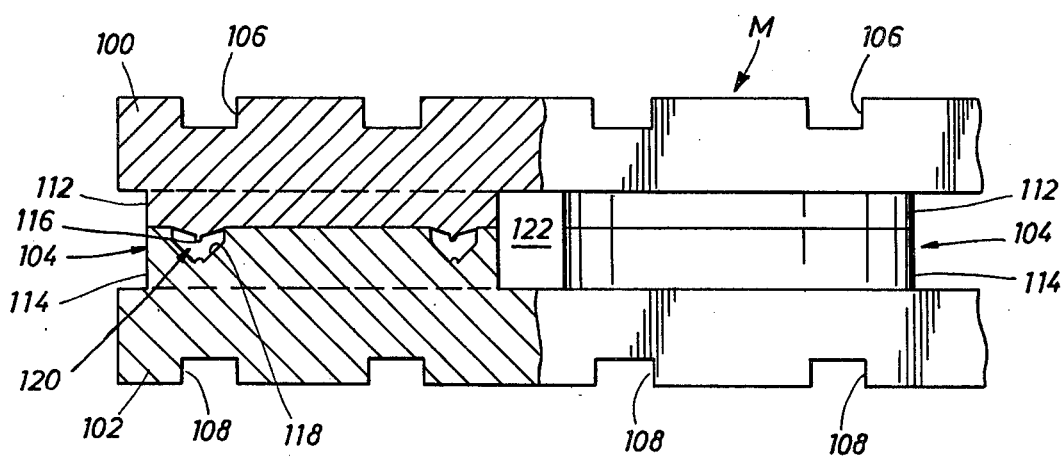
FIG. 7 is an enlarged view, partly in section, showing a portion of the mold of FIG. 6.

Referring to FIG. 7, there is shown an enlarged elevational view, partly in section, of a portion of one of the molds M shown in FIG. 6. Mold frame 100 carries one portion 112 of mold cavity defining insert 104 while mold frame 102 carries the other portion 114 of mold cavity defining insert 104. Portions 112 and 114 have formations as at 116 and 118 which are projecting as to one and receiving as to the other, respectively, thereby forming a mold cavity 120 into which the article to be molded is placed. In the embodiment shown, the mold M would produce an annular v-packing or seal such as is used around reciprocating or rotating pump shafts, pistons, etc. It will be understood, however, that a virtually endless number of configurations of mold cavities can be formed by varying the projecting and receiving formations 116 and 118 on mold cavity defining insert portions 112 and 114. FIG. 7 also demonstrates the ease with which rapid and uniform heat transfer can be accomplished between the heated gaseous medium and the mold M. Each mold insert 104 is spaced from an adjacent mold cavity defining insert 104 by a space 122 which permits the heated gaseous medium to easily flow through the mold M and around the mold cavity defining inserts 104 and heat all exposed surfaces rapidly and uniformly thus ensuring that the curing process will result in a finished product of the desired quality.

The molds M shown in FIG. 7 are generally of the type where the male and female formations 120 are machined in the frame body. It is more common however, for the molds M to be comprised of two platens between which are disposed the two piece mold providing the male and female formations. Referring then to FIGS. 11 and 12, there is shown a series of stacked molds $M_1$, each mold being comprised of a first platen 300 a second platen 302, and a series of individual mold cavity defining inserts 204. Platen 300 has a series of longitudinal bores 400 extending therethrough while platen 302 has a series of longitudinal bores 402 extending therethrough. Bores 400 and 402 allow circulation of the heated gaseous medium through the platens 300 and 302, respectively, thereby facilitating heat transfer from the platens to the mold cavity defining inserts 204. As best seen with reference to FIG. 12, each mold cavity defining insert 204 is comprised of two portions 306 and 308 which have formations as at 310 and 312 which are projecting as to one and receiving as to the other, respectively, thereby forming a mold cavity 314 into which the article to be molded is placed. Like the molds shown in FIGS. 6 and 7, mold $M_1$ would produce an annular v-packing seal such as used around reciprocating or rotating pump shafts, pistons, etc.

It will be understood that the various configurations and the materials of construction of the molding apparatus disclosed herein are virtually endless. Accordingly, the configurations and materials of construction depicted and discussed above are merely illustrative and are not intended in any way to limit the scope of the invention either with regard as to the type of molding apparatus or to the type of construction employed.

I claim:

1. A molding apparatus comprising:
   a curing chamber, said curing chamber being at least partially defined by first and second end walls, said second end wall being movable toward and away from said first end wall;
   a lateral opening for introducing a molding assembly into and removing a molding assembly from said curing chamber, said lateral opening lying between said first and second end walls when said second end wall is farthest from said first end wall;
   a mold stack disposed in said chamber, said mold stack including at least a first molding assembly and a second molding assembly, each of said molding assemblies comprising a first mold frame and a second mold frame, said first and second mold frames including first and second registering formations to define at least one mold cavity, and means defining a plurality of open ended passageways between said mold cavities in said first and second molding assemblies and extending from a first side of said mold stack to a second, opposed side of said mold stack;
   means for circulating a heated, gaseous medium within said curing chamber and through said passageways into direct, heat exchange contact with said molding assemblies;
   means to selectively maintain said curing chamber substantially closed; and
   means to compress said mold stack in said curing chamber between said first and second end walls.

2. The apparatus of claim 1 including means for disposing a plurality of stacked, vertically displaced molding assemblies in said curing chamber.

3. The apparatus of claim 1 including means to selectively position a molding assembly in said curing chamber.

4. The apparatus of claim 1 including means to selectively remove a molding assembly from said curing chamber.

5. The apparatus of claim 1 wherein said curing chamber is in open communication with a gaseous medium inlet and a gaseous medium outlet and said gaseous medium is passed through said curing chamber.

6. The apparatus of claim 1 including a closed loop system for circulating said gaseous medium within said curing chamber.

7. The apparatus of claim 6 wherein said curing chamber is disposed above said piston-cylinder system and said piston is movable from a position upwardly toward said first end wall to compress said mold stack and downwardly away from said first end wall to permit said molding assembly to be removed from said chamber.

8. The apparatus of claim 1 wherein said means for circulating said gaseous medium includes means for circulating said gaseous medium from one side of said curing chamber toward the opposite side of said curing chamber.

9. The apparatus of claim 1 wherein said means to compress said mold stack in said curing chamber comprises a hydraulic piston-cylinder system.

10. The apparatus of claim 7 including latching means selectively operable to hold at least one molding apparatus in said curing chamber when said piston is retracted from said curing chamber.

11. The apparatus of claim 1 wherein said curing chamber has a gaseous medium inlet and a gaseous medium outlet.

12. The apparatus of claim 11 including diffuser means in said gaseous medium inlet.

13. The apparatus of claim 12 including diffuser means in said gaseous medium outlet.

14. A mold stack comprising:
    a first molding assembly and a second molding assembly, each of said molding assemblies comprising a first mold frame and a second mold frame, said first and second mold frames including first and second registering formations to define at least one mold cavity, and means defining a plurality of open ended passageways between said mold cavities in said first and second molding assemblies, said passageways extending from a first side of said mold stack to a second, opposed side of said mold stack, whereby a heated gaseous medium can be transferred through said passageways from said first side of said mold stack to said second, opposed side of said mold stack.

15. The apparatus of claim 14 wherein said passageways comprise longitudinal channels formed in at least one outer surface of at least one of said mold frames.

16. The apparatus of claim 14 wherein said passageways comprise longitudinal bores extending through at least one of said mold frames.

17. The apparatus of claim 14 wherein there are a plurality of mold cavities between said first and second mold frames.

* * * * *